Figure 1A:
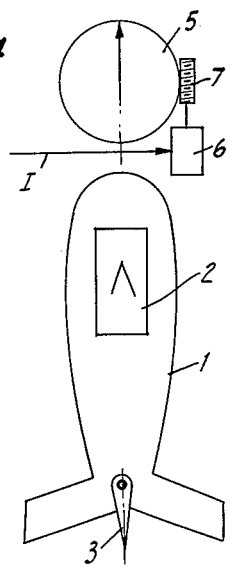

Nov. 30, 1965   W. MOLLER   3,220,672
DEVICE FOR THE CONTROL OF FLYING CRAFT
Filed March 21, 1963   2 Sheets-Sheet 1

INVENTOR.
WALDEMAR MÖLLER
BY
*Edward R. Hyde*
ATTORNEY

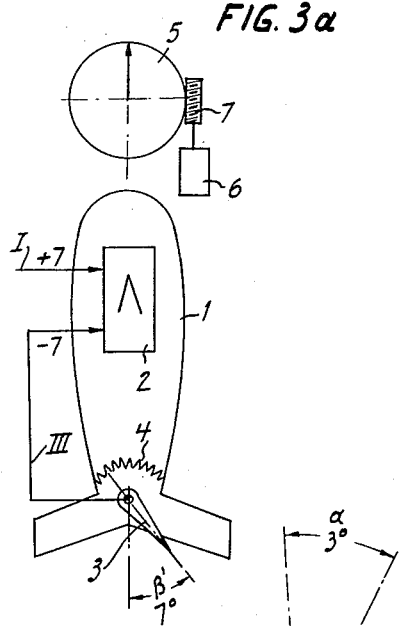
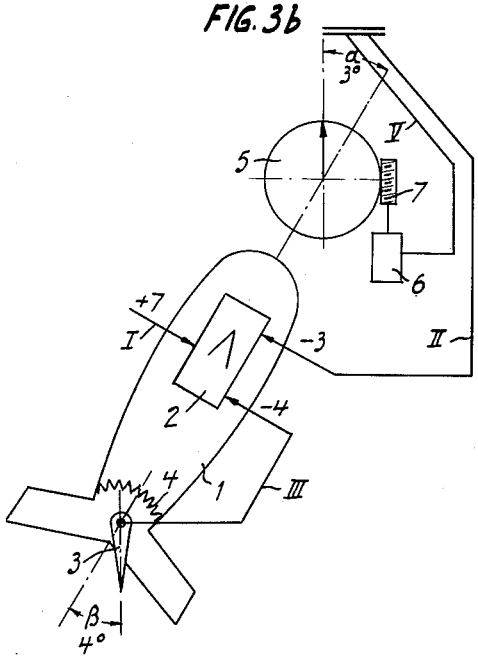
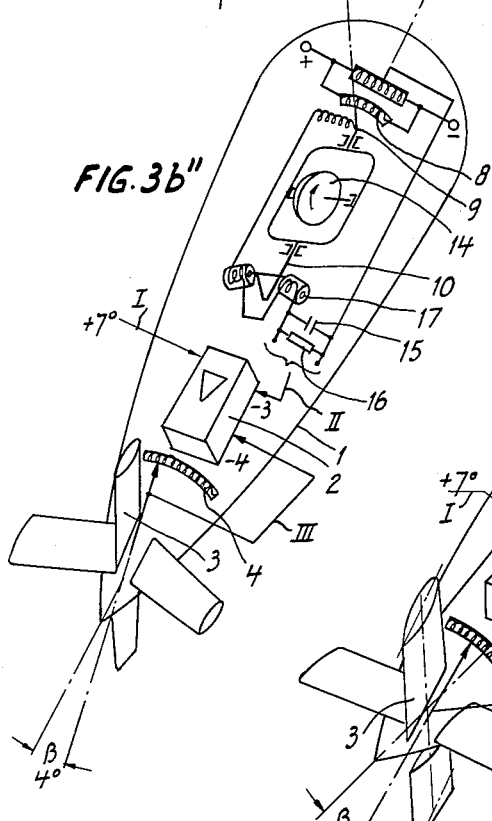
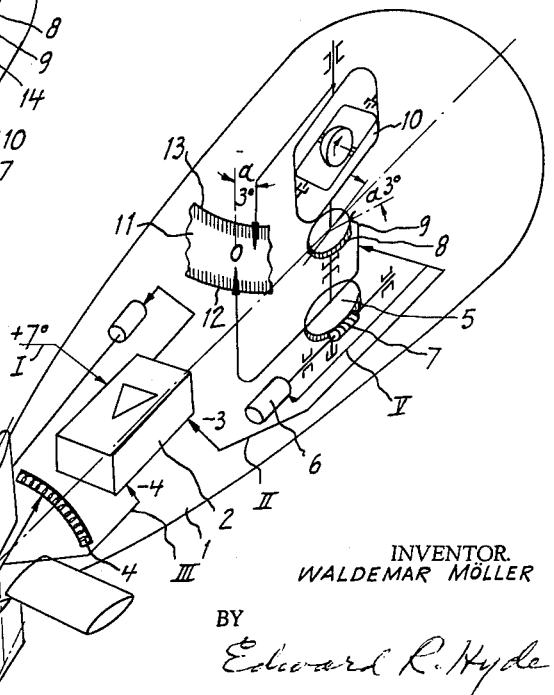

3,220,672
DEVICE FOR THE CONTROL OF FLYING CRAFT
Waldemar Möller, 10 Weinbergerstrasse, Ueberlingen (Bodensee), Germany
Filed Mar. 21, 1963, Ser. No. 267,013
3 Claims. (Cl. 244—77)

This application is a continuation-in-part of my prior application, Serial No. 833,460, filed August 13, 1959, same title, now abandoned.

This invention is concerned with a device for the control of flying craft equipped with an automatically stabilizing movement-control mechanism. As is well known, such a stabilizing control mechanism consists of a position signal transmitter, which may be a gyroscopic device. The gyroscope usually is movable relative to the craft and remains fixed in space. The gyroscope shifts relative to a pick-off that is fixed with respect to the flying craft and generates a stabilizing impulse. This stabilizing impulse acts upon a controller which effects a movement of the control surface proportional to the stabilizing impulse. The proportionality of the control surface movement is guaranteed by a return impulse transmitted by the movement-control mechanism to the controller. Automatically operating stabilization apparatus of this kind is well known in the art and is applicable to all of the three space axes of a flying craft, i.e., for course, bank and attitude stabilization.

If the course of a craft using an automatic stabilizing device of the type referred to above is to be changed, this has been hitherto accomplished by rotating the pick-off of the position signal transmitter with respect to the craft by means of a so-called "turn-signal." Normally, an electric motor controlled by the turn signal drives a platform carrying the pick-off of the position signal transmitter by means of a worm gear. The rotation of the platform generates a control signal which causes movement of the control surface by the action of the controller. The desired change in flight path is effected by this movement of the control surface.

The above process of changing the flight path takes place with a lag which cannot be tolerated with craft, such as rockets, flying at very high speeds. This lag is due to the following effects.

In order to effect a change of the flight path at a rate of turn of $x°/\text{sec.}$, a certain "angle of incidence" $\alpha$, i.e. an angle between the longitudinal axis of the craft and the flight path tangent, namely the momentary direction of movement of the center of gravity of the craft, is necessary. By such an angle of incidence a force transverse to the momentary direction of flight is exerted on the flying craft by the aerodynamic resistance, whereby a curvature of the flight path is caused. Thus the curvature of the path to be initiated by the turn signal is only a result of the angle of incidence. By the rotation of the platform in the above mentioned device, by which the set value of the automatic pilot is adjusted, the position of the flying craft in space is first affected, and thereafter the flight path. This change of position with the angle of incidence associated therewith then cause a curvature of the path.

For simplicity, it is assumed that an angle of incidence of $3°$ is necessary in order to effect a change of the path at a rate of $x=2°/\text{sec.}$ If now the turn signal rotates the platform at a rate of $2°$ sec., at first the direction of flight will not be rotated at $2°/\text{sec.}$ After one tenth of a second the angle of incidence is $\alpha=0.2°$, if it is assumed that the position of the craft in space will follow the turn signal with little inertia. This means, however, that the rate of turn of the path is then $$x = 2 \cdot \frac{0.2}{3} \, °/\text{sec.} = 0.13 \, °/\text{sec.}$$

After half a second—if the change of the flight path effected in the meantime is neglected—the angle of incidence is $\alpha=1°$ and the rate of turn is $x=2.\frac{1}{3}=\frac{2}{3}°/\text{sec.}$ Thus the change of the flight path lags behind the rotation of the flying craft, until the angle of incidence, $3°$ in the example used here, has been reached. Then assuming a constant air speed, the flying craft rotates further at the rate of turn given by the turn signal, the longitudinal axis of the flying craft, however, always leading with respect to the flight path tangent by the angle of incidence.

If, upon reaching a certain desired direction of flight, the turn signal ceases, the angle of incidence between direction of flight, i.e. the path of the centre of gravity, and the longitudinal axis of the craft still exists. Thus by the ceasing of the signal the change of the flight path is not stopped, but the flying craft gets lateral forces and changes its direction of flight until the direction of flight is aligned with the longitudinal axis of the flying craft. The position of the craft in space is determined by the position of the platform in that moment, when the turn signal has come to an end.

It has been assumed hereinbefore, that the flying craft follows the rotation of the platform without lag. However, this is not the case. In order to maintain an angle of incidence, there must be a rudder deflection. Should the flying craft follow the rotation of the platform completely and thereby make the signal from the position signal transmitter zero, the rudder deflection would become zero. Then the flying craft would tend to return into the flight path tangent under the influence of its inherent stability. Thus in the state of balance, the platform must always be rotated through a larger angle than the flying craft is rotated in space, so that an error signal remains at the pick-off which produces a rudder deflection for maintaining the angle of incidence.

When the turn signal has come to an end, the flying craft will continue to rotate in the same direction until it is realigned with the platform. At that point the control impulse becomes zero. Assume now that a turn signal is given in the opposite direction. A control impulse acting in the wrong direction is still effective at the controller until the platform has been rotated to the opposite side by means of the new turn signal. It will be readily understood that such a control action will lead to oscillation about the desired flight path.

It is, therefore, the object of the present invention to provide in a stabilized flying craft a turn signal effective without lag without, however, adversely affecting the functioning of the automatic stabilizing device.

It is a further object of this invention to provide a new and improved automatic pilot system which will quickly respond to turn signals and bring the craft to its new course in a minimum time, and with little or no oscillation or hunting about the prescribed new course.

Still other objects and advantages of my invention will be apparent from the specification.

The features of novelty which I believe to be characteristic of my invention are set forth with particularity in the appended claims. My invention itself, however, both as to its fundamental principles and as to its particular embodiments, will best be understood by reference to the specification and accompanying drawing, in which FIGS. 1a, 1b, 2a and 2b are schematic diagrams illustrating principles of automatic piloting systems which are helpful in understanding my present invention; and FIGS. 3a, 3b, 3b' and 3b'' are schematic diagrams illustrating my invention.

In FIGS. 1a, 1b, 2a, 2b, 3a and 3b the angles shown have been exaggerated for the sake of clarity.

In the figures, 1 represents the flying craft, which may be an airplane or a rocket, the flight of which is to be controlled, for instance by control surface 3, herein diagrammatically shown as a rudder, although it may also be the elevator or ailerons, operated by a servo-motor (not shown). The control surface in turn carries a pick-off arm riding on potentiometer 4 to provide a feed-back signal indicating the position of the control surface. It will be understood that when the control surface is centered, the voltage pick-up from potentiometer 4 will be zero, while if it is shifted for a right turn, for example, a negative voltage will be picked up, the magnitude of which is proportional to the departure of the control surface from centered position, while if it is shifted for a left turn, the voltage feed-back will be positive and proportional to the control surface displacement.

The position of the control surface is determined by a controller 2 which may be an electric mixing amplifier feeding the servo-motor (not shown) which positions the control surface.

The craft carries a platform 5 rotatable with respect to the craft and driven by motor 6 through worm gear 7. Platform 5 forms part of the control system of the automatic pilot which may include a directional gyroscope fixed in space, and which may have mounted on it a potentiometer mounted on the gyroscope. This potentiometer is engaged by a pick-off arm mounted on and carried by platform 5. When the craft is stable condition, flying on a straight line prescribed course, the control surface is centered, there is no feed-back voltage; platform 5 is stationary, and the potentiometer pick-off arm is in zero position on the potentiometer carried by the gyroscope, so that the voltages fed to the controller 2 are zero.

It will be helpful in understanding the operation of the system of my invention if the following points are kept in mind:

(1) In FIGS. 1a, 1b, 2a, 2b and 3b' the gyroscope is a free gyroscope, i.e., it remains fixed in space, regardless of the direction or attitude of the craft.

(2) The potentiometer contacted by the pick-off arm on platform 5 is carried by the gyroscope.

(3) Platform 5, carried by the craft, is not fixed in space, but rotates with the craft, except when its position with respect to the axis is changed by operation of motor 6.

(4) The rest position of platform 5 is such that the potentiometer arm carried by platform 5 is in zero position on the potentiometer carried by the gyroscope, so that the pick-off voltage fed to the controller 2 is zero.

(5) Whenever the pick-off arm is in other than zero position on the potentiometer carried by the gyroscope, a voltage is picked off by the arm.

(6) In order to effect a curvature of the flight path an angle of incidence, i.e. an angle between the longitudinal axis of the flying craft and the flight path tangent must be produced. First the flying craft must be rotated in space, and the aerodynamic forces then acting on the flying craft produce a transverse force, which causes a curvature of the flight path.

(7) A change of the position of the flying craft in space is effected by a deflection of the rudder. The aerodynamic forces acting on the rudder produce a torque about the centre of gravity of the craft, and the flying craft assumes such a position relative to the flight path tangent, that the torques produced by the aerodynamic forces acting on the flying craft balance this torque on the rudder.

(8) The signal picked-off from the potentiometer causes a rudder deflection which tends to reduce the signal to zero by rotation of the craft.

(9) The turn signal is to initiate a change of the flight path tangent in space at a rate of turn (°/sec.) proportional to the turn signal. The rotation is to take place at this rate as long as the turn signal lasts.

Before describing the operation in response to a turn signal, the operation in response to a yaw caused by a gust will be described. As the craft yaws, platform 5, being fixed on the craft and motor 6 not being operated, will rotate in space with the craft, but will remain fixed with respect to the craft. This carries the pick-off arm away from zero position in a positive or negative direction on the potentiometer, and a positive or negative voltage is fed to controller 2, which actuates the control surfaces to return the craft to the prescribed heading, at which the voltage picked off from the potentiometer is again zero, and the control surface is returned to centered position.

Figure 1B:
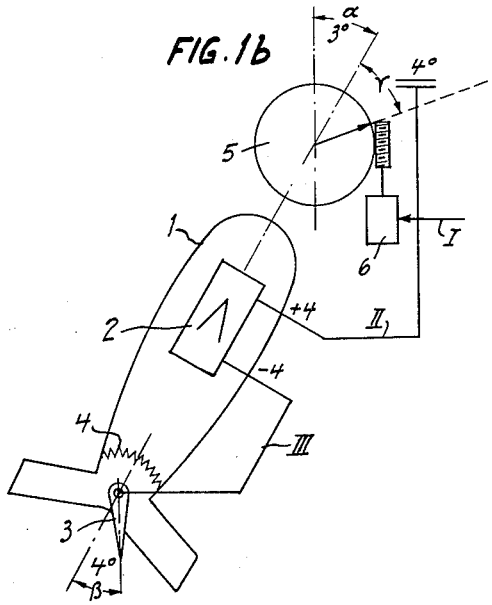

What happens when a turn signal is received will now be described, first with reference to FIGS. 1a and 1b. Assume that the craft is flying on a course of 000° in FIG. 1, and a turn signal is received directing a turn of the flight path with a rate of turn of 2°/sec., i.e., an angle of incidence of 3° with the assumption made hereinbefore. This turn signal is impressed on motor 6.

For simplicity of explanation, certain assumptions may now be made. These are as follows: Assuming a constant air speed, the rate of turn of the flight path depends on the angle of incidence and the latter depends on the rudder deflection. It had been assumed that an angle of incidence of 3° produces a rate of turn of 2°/sec.

It will be assumed that a deflection of 1° of the pick-off of the position signal transmitter from its zero position is necessary, in order to produce 1° rudder deflection. Further it is assumed that a rudder deflection of 4° be necessary to produce and maintain an angle of incidence of $\alpha=3°$. Then the platform must be rotated through an angle $\gamma=4°$ in addition to this angle $\alpha=3°$ in orer to maintain the necessary angle of incidence of $\alpha=3°$. Also, to produce an angle of incidence of $\alpha$, a deflection of the control surface $\beta$ is required.

The turn signal, impressed on motor 6, causes the platform to rotate through angle $\alpha+\gamma=3+4°$. Rotation of the platform carries the pick-off arm off zero position on the potentiometer fixed in space by the gyroscope, so that a voltage is picked up and fed to controller 2, causing deflection of the control surface to cause a clockwise rotation of the craft through the angle of incidence $\alpha=3°$. In the steady state there is a deflection of the pick-off from its zero position of $\gamma=4°$, causing the 4° deflection of the rudder necessary to maintain an angle of incidence of $\alpha=3°$. This angle of incidence causes the turn of the flight path with a rate of turn of 2°/sec. This system is relatively slow in response, since the craft follows platform 5, which must be rotated in advance to initiate the response to the turn signal, and overshooting and hunting or oscillation about the new course necessarily result.

Figure 2A:
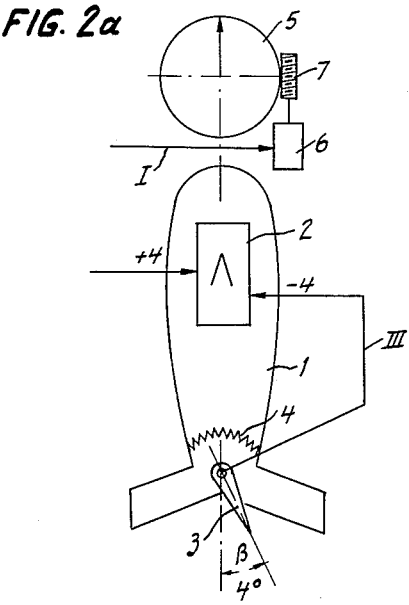
Figure 2B:
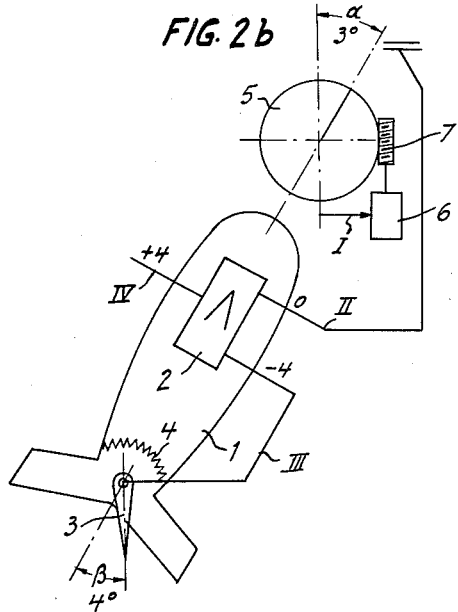

Referring now to FIGS. 2a and 2b, the turn signal (arrow I) is not only fed to motor 6 of platform 5, but is simultaneously applied to controller 2 (arrow IV). The craft turns under the influence of the turn signal (arrow IV) while at the same time platform 5 is rotated by motor 6 but remains stationary with respect to the craft, at the same rate and therefore the signal picked off from platform 5 by the potentiometer slider will be zero. The signal (arrow IV) supplied to controller 2 is opposed at the controller only by a feed-back signal from the rudder (arrow III), so that in the stationary state (FIG. 2b), with a deflection $\beta=4°$ of the control surface, and the craft rotated through an angle of incidence of $\alpha=3°$, the platform 5 has remained fixed with respect to the craft. The counterclockwise rotation of the craft through $\alpha=3°$ has been compensated by clockwise rotation of the craft in space also through $\alpha=3°$.

It will be understood that while in the case of FIG. 1 the rotation of platform 5 precedes the turn of the craft, in the case of FIG. 2 the craft and platform 5 turn at the same time. No additional rotation of the platform in order to maintain the necessary rudder deflection is necessary. This means that with the system of FIG. 2 the craft responds more quickly to a turn signal than with that of FIG. 1, yet with the system of FIG. 2 oscillations about the new flight path cannot be avoided due to the fact, that here the angle of incidence necessary to effect the 2°/sec. turn of the flight path ($\alpha=3°$) is not obtained at once but is gradually built up.

In accordance with this invention as shown in FIGS. 3a and 3b, the turn signal is fed only to controller 2, and platform 5 is not rotated by the turn signal, but by the departure of the pick-off arm from zero position on the potentiometer fixed in space, caused by turning of the craft. A deflection $\beta'$ of the control surface 3 is caused by the turn signal. At the controller 2, the turn signal (arrow I) is counteracted by a feed-back signal (arrow III) from the control surface 3. The turn signal (arrow I) must be applied to the controller 2 with such intensity that in the stationary state (FIG. 3b) a deflection $\beta=4°$ of the control surface is obtained, with an angle of incidence $\alpha=3°$. As an angle of incidence $\alpha$ is not present at the moment of application of the turn signal (FIG. 3a), the turn signal (+7) is balanced at the controller 2 only by a corresponding feed-back signal (−7) (arrow III). Thus, too large a deflection $\beta'=7°$ of the control surface is obtained at first, by which the craft is turned quickly through the angle of incidence $\alpha=3°$. As the craft turns, a negative control signal (arrow II) is, however, produced from the platform pick-off arm by the gyroscope carrying the potentiometer fixed in space. The negative signal picked off by the slider of the potentiometer is fed to controller 2 to oppose the turn signal. This negative control signal (arrow II) has the value of −3, as soon as the desired angle of incidence has been reached. When this occurs, the turn signal +7 is balanced in the controller 2 by the feed-back signal −4 (arrow III) and the negative control signal −3 (arrow II). Thus, a correspondingly smaller feed-back signal (−4) will be sufficient to achieve a state of balance.

The deflection $\beta'$ of the control surface, which was too large (7°) at the beginning, is accordingly decreased to the desired value $\beta=4°$, and the condition shown in FIG. 3b is obtained with a negative control signal (arrow II) following up platform 5. Therefore, in this device the angle of incidence ($\alpha=3°$) necessary for the desired rate of turn ($x=2°$/sec.) of the flight path is achieved immediately as soon as the turn signal is received. Thus, the flying craft reaches the desired turn rate of 2°/sec. much earlier, and the necessary angle of incidence need not be built up gradually.

The negative control signal (arrow II) is fed to motor 6 at the same time it is fed to controller 2, so that the platform slowly follows up to compensate for the turn of the flight path and the corresponding rotation of the craft in space. If the turn signal comes to an end, the rudder makes a deflection to the opposite side, in order to balance the negative signal II of the position signal transmitter (−3), and thereby rotates the flying craft in such a manner that the angle of incidence becomes zero at once. Thereby the lateral force comes to an end and the flying craft flies in a straight line. By this rotation, the signal II from the position signal transmitter becomes zero and the rudder returns to its zero position.

Oscillations or hunting about the new course are thereby avoided.

Referring now more particularly to FIG. 3b', showing in more detail the arrangement of FIGS. 3a and 3b, numeral 1 designates the flying object, having controller 2, and control surface 3 operated by a servo-motor (not shown). Control surface 3 carries a pick-off arm riding on potentiometer 4. Platform 5 is rotatable with reference to the longitudinal axis of the craft, and is driven by motor 6, fixedly mounted in the craft, through worm 7, and carries slider 9 of a potentiometer 8, fixed in space by being mounted on gyroscope assembly 10, the gyroscope also being fixed in space.

For clarity, an indicator 11 is shown having a lower scale 12 and an upper scale 13 with corresponding pointers, the lower scale showing the angle between platform 5 and the longitudinal axis of the craft, and the upper the angle between the gyroscope and the longitudinal axis of the craft, in this case 3° in the stationary state as explained with reference to FIGS. 3a and 3b. Arrow I is the turn signal (+7) fed to controller 2; arrow V the signal picked off potentiometer 8 fixed in space, by slider 9 secured to platform 5, and fed to motor 6 and controller 2.

It will be understood that if the craft turns through an angle $d'$, slider 9 rotates through the angle $d'$ with respect to potentiometer 8 fixed in space, and picks off a voltage which, applied to motor 6, returns slider 9 to zero position, and also, applied to controller 2, causes appropriate movement of the control surface. The magnitudes and signs of the various signal voltages are indicated in small numerals on this figure.

In the case of FIG. 1, slider 9 is rotated by the turn signal fed to motor 6 into positive directional relationship relative to the potentiometer 8 affixed to the gyroscope, so that the craft must be turned with the slider 9 by a positive signal II until the slider 9 has reached its zero position on the potentiometer again and the signal II becomes zero.

In the case of FIGS. 3a, 3b and 3b', however, at first the craft with slider 9 is turned by the turn signal I directly fed only to the controller 2, so that a negative signal II is tapped from the potentiometer 8 fixed in space.

While the arrangements of FIGS. 3a, 3b and 3b' have dealt with an automatic pilot system embodying a potentiometer and associated gyroscope fixed in space, my invention may also be embodied in a system having a fettered integration gyroscope as described in United States patent applications Serial Nos. 827,770 and 839,918, to which reference may be had. Such a system is shown in FIG. 3b''. In this figure, as before, numeral 1 designates the craft having controller 2 which feeds a servo-motor (not shown) which actuates control surface 3. Control surface 3 delivers a feed-back voltage (arrow III) to controller 2 by means of a pick-off on potentiometer 4. The gyroscope 14 is mounted for rotation in a frame, which is in turn mounted for movement on processional axis 10 parallel to the longitudinal axis of the craft. The precessional axis 10 carries a potentiometer slider 9 which rides on potentiometer 8, rigidly mounted on the craft, and picks off a voltage proportional to the rate of turn of the craft.

This voltage is impressed on torque generator 17, through integrating capacitor 15, in such a manner that the voltage is proportional to the orientation deviation of the craft (in this instance, the azimuth deviation), which replaces the unfettered gyroscope with potentiometer pick-off carried by platform 5 in the other figures. Resistor 16 is connected in parallel with capacitor 15, whereby a feed-back signal is fed to the torque generator 17, which is employed in this embodiment instead of the follow-up motor 6 earlier described.

The signal II, dying down with time, which acts on the torque generator 17 of the integrating gyroscope, is the same signal II which is obtained from the free gyroscope with the follow-up potentiometer of FIG. 3b'. It should be noted that in the system of FIG. 3b'', the turn signal is not fed to the torque generator 17, but to the controller 2, so that at first a negative signal II, decreasing as a function of time and counteracting the turn of the craft, is produced by the gyroscope system.

In the foregoing specification I have described the best mode of carrying out my invention presently known to me, and for certain cases the preferred form, but it will be understood that modifications and changes may be made without departing from the spirit and scope of my invention, as will be clear to those skilled in the art.

In particular, while I have shown and described embodiments of my invention as applied to the rudder control, the principles of my invention may be applied to control the craft about all three of its axes; i.e., my invention may be used to control the elevator and ailerons as well as the rudder.

I claim:

1. In an automatic pilot system for a craft having a control surface, a servo-motor for positioning said control surface, a controller for causing operation of said servo-motor, a gyroscope carrying a potentiometer, a platform rotatable with respect to the longitudinal axis of said craft, and having a motor drive, a pick-off engaging said potentiometer, said pick-off being mounted on said platform, and means for impressing on said controller three voltages respectively, the first voltage indicating the turn to be made, and causing rotation of said control surface, the second voltage opposing the first voltage and indicating the position of said control surface, and the third voltage opposing the first voltage and indicating the angular displacement of said platform from center position.

2. The combination claimed in claim 1 in which said gyroscope is fixed in space.

3. The combination claimed in claim 1 in which said voltages are direct current voltages.

References Cited by the Examiner
UNITED STATES PATENTS

| | | | |
|---|---|---|---|
| 2,317,383 | 4/1943 | Hull | 244—76 |
| 2,941,139 | 6/1960 | Marx | 244—77 |
| 2,979,290 | 4/1961 | Baliguet | 244—83 X |
| 3,082,628 | 3/1963 | Moller | 74—5.4 |

MILTON BUCHLER, *Primary Examiner.*

RALPH D. BLAKESLEE, *Examiner.*